(12) United States Patent
Kotecha et al.

(10) Patent No.: US 8,973,068 B2
(45) Date of Patent: Mar. 3, 2015

(54) VIDEO ON DEMAND DELIVERY OPTIMIZATION OVER COMBINED SATELLITE AND WIRELESS BROADBAND NETWORKS

(75) Inventors: Lalit R. Kotecha, San Ramon, CA (US); William H. Stone, Basking Ridge, NJ (US); Matthew W. Nelson, Pleasanton, CA (US); Kamlesh S. Kamdar, Dublin, CA (US); Sergio Aguirre, Southlake, TX (US); Raafat Edward Kamel, Little Falls, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 328 days.

(21) Appl. No.: 13/083,238

(22) Filed: Apr. 8, 2011

(65) Prior Publication Data
US 2012/0260299 A1    Oct. 11, 2012

(51) Int. Cl.
| | |
|---|---|
| *H04N 7/173* | (2011.01) |
| *H04L 12/911* | (2013.01) |
| *H04N 21/24* | (2011.01) |
| *H04N 21/262* | (2011.01) |
| *H04N 21/472* | (2011.01) |
| *H04N 21/61* | (2011.01) |
| *H04N 21/647* | (2011.01) |
| *H04W 4/06* | (2009.01) |
| *H04L 29/06* | (2006.01) |

(52) U.S. Cl.
CPC .......... *H04L 47/826* (2013.01); *H04N 21/2402* (2013.01); *H04N 21/26216* (2013.01); *H04N 21/47202* (2013.01); *H04N 21/6131* (2013.01); *H04N 21/64738* (2013.01); *H04W 4/06* (2013.01); *H04L 69/14* (2013.01); *H04L 65/4084* (2013.01); *H04L 47/824* (2013.01)
USPC .............................. 725/96; 725/118; 370/229

(58) Field of Classification Search
USPC ............................ 725/96, 118; 370/229–240
See application file for complete search history.

(56) References Cited

U.S. PATENT DOCUMENTS

| | | | | |
|---|---|---|---|---|
| 8,176,198 | B2 * | 5/2012 | Lobsenz | 709/234 |
| 8,239,573 | B2 * | 8/2012 | Brownrigg, Jr. | 709/241 |
| 8,260,346 | B2 * | 9/2012 | Kim et al. | 455/552.1 |
| 2005/0179607 | A1 | 8/2005 | Gorsuch et al. | |
| 2007/0173303 | A1 | 7/2007 | Viorel et al. | |
| 2008/0263348 | A1 * | 10/2008 | Zaltsman et al. | 713/2 |
| 2010/0311321 | A1 | 12/2010 | Norin | |
| 2010/0313232 | A1 | 12/2010 | Norin | |
| 2012/0163203 | A1 * | 6/2012 | Wilkinson et al. | 370/252 |

* cited by examiner

*Primary Examiner* — Olugbenga Idowu

(57) ABSTRACT

Video content may be delivered in a wireless network based on network load information relating to radio interfaces for the wireless network. A method may include receiving a request, from a set-top box, for video content from the set-top box to the wireless network and determining, based on the load information, whether a portion of the wireless network corresponding to the set-top box is in a first state or a second state. The network may further include transmitting the video content when the portion of the network corresponding to the set-top box is in the first state and delaying transmission of the video content when the portion of the network corresponding to the set-top box is in the second state, until the portion of the network corresponding to the set-top box enters the first state.

22 Claims, 9 Drawing Sheets

VIDEO ON DEMAND DELIVERY OPTIMIZATION OVER COMBINED SATELLITE AND WIRELESS BROADBAND NETWORKS

BACKGROUND

Bundled media services (e.g., combination packages of television, telephone, and broadband Internet services) have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless services for some of these services (e.g., broadband access).

Wireless broadband can potentially be used to provide, either by itself or as a supplement to another communication channel (e.g., satellite), television and/or video service to the subscriber. Television/video services, however, may require significant bandwidth. In some situations, the bandwidth required by video delivered over wireless broadband networks can burden the capacity of the wireless network.

DETAILED DESCRIPTION OF PREFERRED EMBODIMENTS

The following detailed description refers to the accompanying drawings. The same reference numbers in different drawings may identify the same or similar elements.

Systems and/or methods described herein may relate to wireless broadband and television service provided by the combination of a terrestrial wireless network and a satellite network. Television services may be primarily provided through the satellite network. The wireless network may be used to supplement video (e.g., television) services provided by the satellite network, such as by providing video on demand (VoD) content or other "long tail" video content. The supplemental video services may be intelligently provided over the wireless network in a way that avoids congestion of the wireless network.

Figure 1:
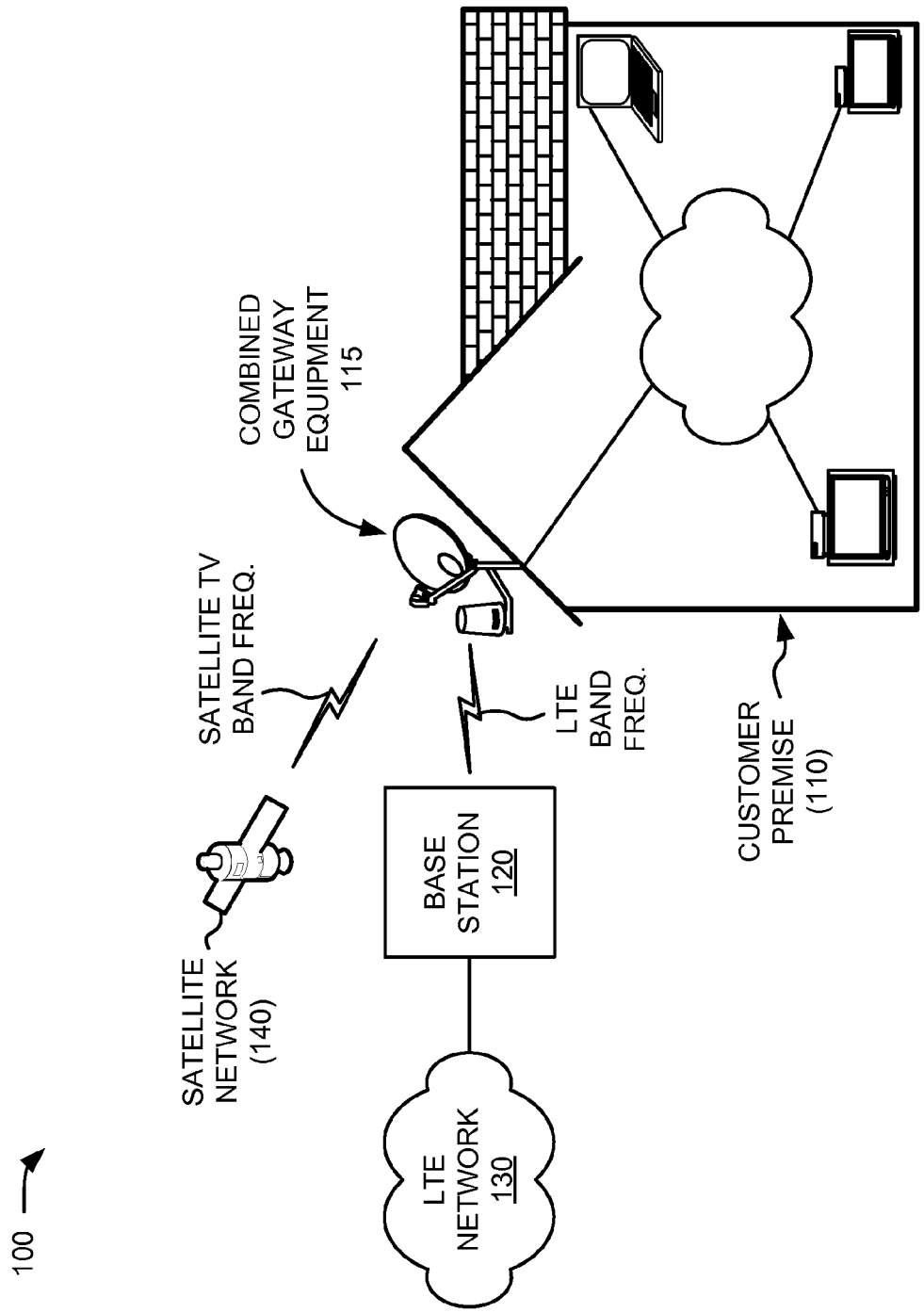
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premise 110, combined gateway equipment 115, a base station 120, a long term evolution (LTE) network 130, and a satellite network 140. A single customer premise 110, combined gateway equipment 115, base station 120, LTE network 130, and satellite network 140 have been illustrated in FIG. 1 for simplicity. In practice, there may be more customer premises 110, combined gateways 115, base stations 120, LTE networks 130, and/or satellite networks 140.

Customer premise 110 may include one or more devices connected to each other, base station 120, and/or satellite network 140. Devices in customer premise 110 may include, for example, set-top boxes (STBs), televisions, computers, and home networking equipment (e.g., routers, cables, splitters, local gateways, etc.). Devices within customer premise 110 may be connected via wired (e.g., coaxial cable, Telecommunications Industry Association category 5 ("cat 5") cable, etc.) or wireless connections (e.g., using network devices such as those available under the IEEE 802.11 wireless LAN standards). In the example shown in FIG. 1, customer premise 110 may connect to base station 120 through a two-way wireless connection (e.g., using a LTE band frequency) and may connect to satellite network 140 through a one-way (e.g., downlink) wireless connection (e.g., using a satellite TV band frequency). The two-way wireless connection and the one-way wireless connection may be implemented using combined gateway equipment 115.

Combined gateway equipment 115, which is described in more detail below, may generally include mechanisms for communicating with satellite network 140 (to provide satellite-based communications) and for communicating with base station 120 (to provide terrestrial RF-based communications). Combined gateway equipment 115 may connect, such as via a coaxial connection, to devices inside of the customer premises, such as the devices within to customer premise 110.

Base station 120 may include one or more computation and/or communication devices that receive voice and/or data (e.g., video content) and transmit that voice and/or data to customer premise 110. Base station 120 may also receive data transmitted from customer premise 110. In one implementation, base station 120 may utilize LTE standards operating in a 700 MHz frequency band (i.e., base station 120 may be a base station in an LTE network). In the context of an LTE network, base station 120 may also be referred to as an "eNodeB" or "eNB." Base station 120 may provide a radio interface for LTE network 130.

LTE network 130 may include a network that provides connectivity to base station 120. LTE network 130 may include a local area network (LAN), a wide area network (WAN), a metropolitan area network (MAN), other types of networks, or a combination of networks.

Satellite network 140 may provide multimedia (e.g., broadcast television) content from, for example, a direct broadcast satellite (DBS) service provider (not shown). Satellite network 140 may provide a downlink signal over a designated satellite TV band frequency, typically in the range of 950 MHz to 2150 MHz. The downlink signal may be received using a satellite antenna/receiver system at the customer premises, such as combined gateway equipment 115, to present satellite TV content to a user.

In implementations described herein, customer premise 110 may combine LTE functionality with satellite TV service. Using combined gateway equipment 115, both broadband (over LTE) service (e.g., via base station 120) and satellite TV service (e.g., via satellite network 140) may be brought into customer premise 110 over a single coaxial line. This architecture may reduce equipment installation time due to the use of a single coaxial line for all the services. Both installation costs and recurrent operational costs can be reduced.

The multimedia content provided by satellite network 140 may generally include broadcast content that may be received by all customers of satellite network 140. Because of the one way nature of satellite network 140, VoD content or other video content may not be effectively delivered over satellite network 140. For this type of content, it may be desirable to supplement the multimedia content from satellite network 140 with multimedia content delivered through the terrestrial wireless network (e.g., the LTE frequency band).

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100.

Figure 2:
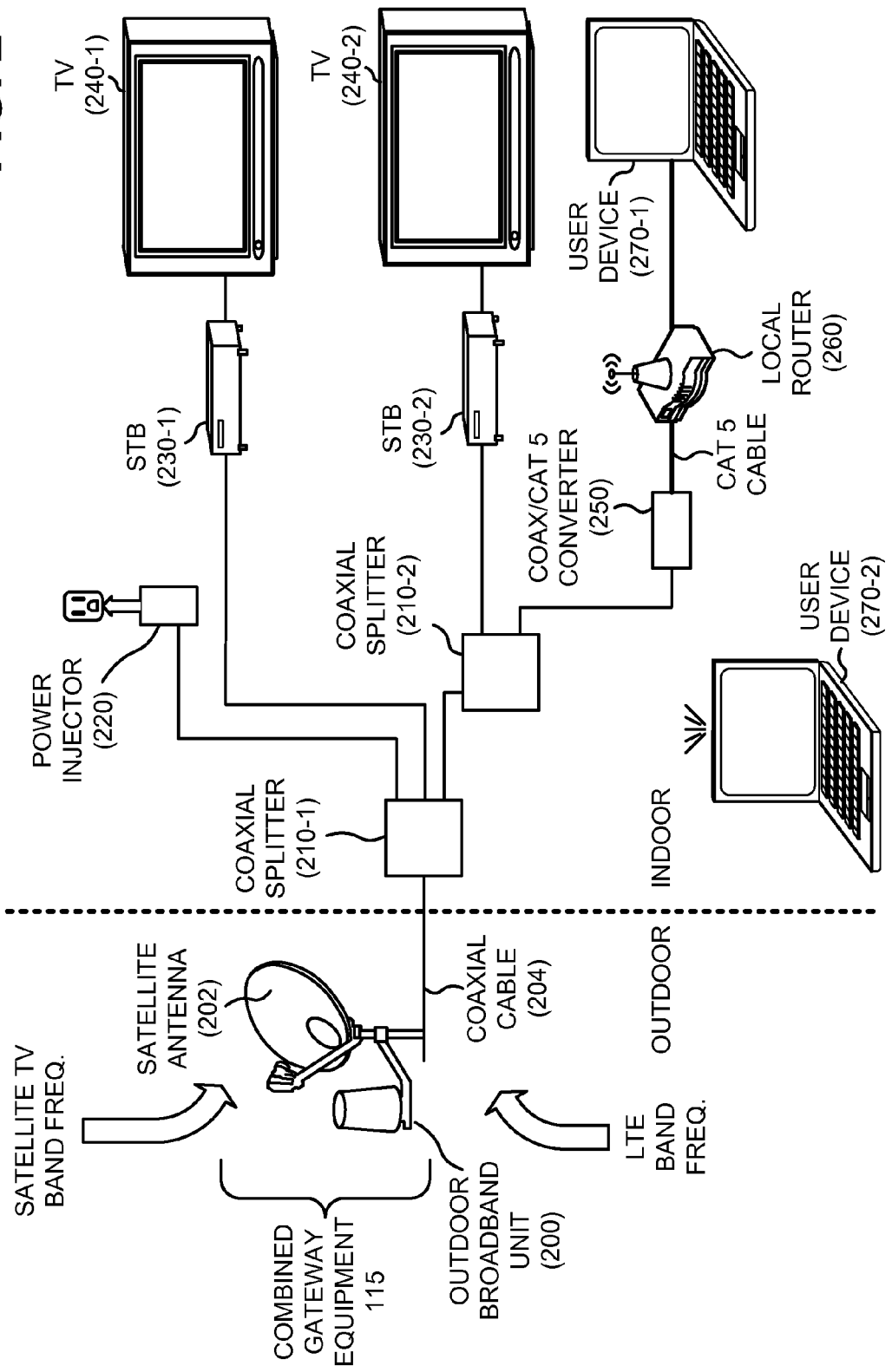
FIG. 2 is a diagram of an example customer premise according to an implementation described herein.

FIG. 2 is a diagram of an example customer premise 110 according to an implementation described herein. As illustrated, combined gateway equipment 115 of customer premise 110 may include an outdoor broadband unit 200 and a satellite antenna 202. A coaxial cable 204 may connect combined gateway equipment 115 to the indoor portion of customer premise 110. Customer premise 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing devices and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premise 110) as part of combined gateway equipment 115. For example, outdoor broadband unit 200 may utilize a pre-existing or a new satellite TV installation in a way that both broadband (over LTE) service and satellite TV are brought indoors (e.g., inside the customer premises) over coaxial cable 204.

Satellite antenna 202 may provide an interface for television service broadcast from satellites. In one implementation, satellite antenna 202 may provide an entry point for a network (e.g., customer premise 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter. For example, coaxial splitters 210 may facilitate allocating logical channels using different frequency blocks for viewer-selected television programming and broadband signals to the SWiM-compatible STBs 230 and/or local router 260.

Power injector 220 may include a mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 converter 250 may include a device to convert incoming signals from coaxial cables to outgoing signals on Cat 5 cables.

Local router 260 may include a device that may provide connectivity between equipment within customer premises (e.g., user devices 270) and between the customer premises equipment and an external network (e.g., LTE network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a USB Ethernet Router that is capable of meeting LTE quality of service (QoS) standards.

User device 270 may include any device that is capable of communicating with customer premise 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a tablet computer, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a gaming system, etc.

Although FIG. 2 shows example components of customer premise 110, in other implementations, customer premise 110 may contain fewer components, different components, differently arranged components, and/or additional components than those depicted in FIG. 2. Alternatively, or additionally, one or more components of customer premise 110 may perform one or more tasks described as being performed by one or more other components of customer premise 110.

Figure 3:
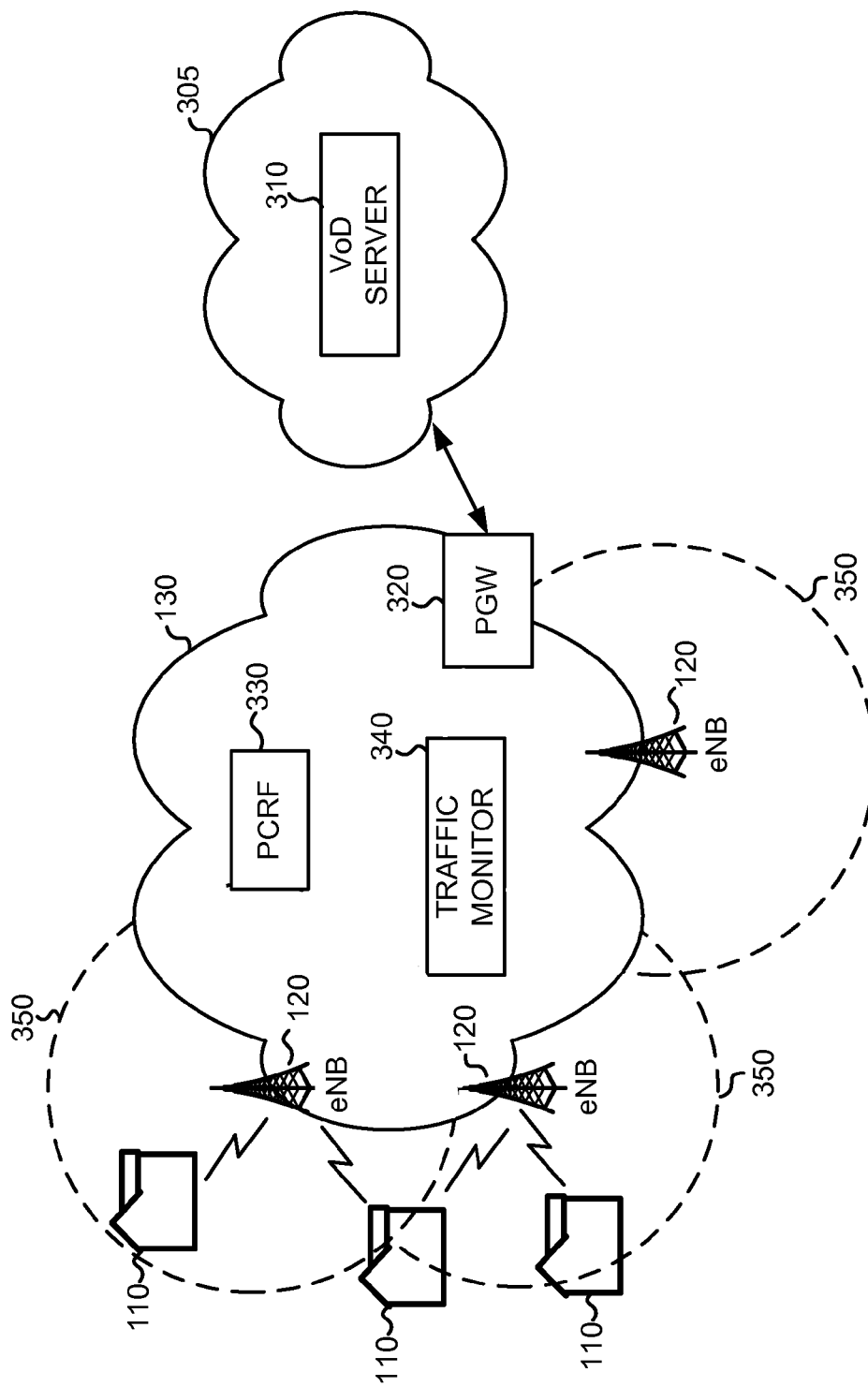
FIG. 3 is a diagram illustrating an example portion of the environment shown in FIG. 1 in additional detail.

FIG. 3 is a diagram illustrating an example portion of environment 100 in additional detail. LTE network 130 and a group of base stations 120 are particularly shown in FIG. 3.

As shown in FIG. 3, LTE network 130 may provide wireless broadband services to a number of customer premises 110. LTE network 130 may also connect to other networks, such as an external packet network 305. In some implementations, in addition to serving customer premises 110, LTE network 130 may also provide wireless service to traditional mobile devices, such as cellular phones.

Packet network 305 may include, for example, a public packet-based network, such as the Internet. One or more servers, such as video on demand (VoD) server 310, may be connected to or located within packet network 305. VoD server 310 may include devices designed to provide video to customer premises 110. The provided video may include, for examples, movies, television shows, or other multimedia content, that is delivered to a customer premise 110 in response to a request from customer premise 110. The video may be delivered, for instance, as IP unicast traffic. Although VoD server 310 is shown as part of packet network 305, in an alternative implementation, VoD server 310 may be part of another network, such as LTE network 130.

The components of LTE network 130 may include base stations (eNBs) 120, a packet data network gateway (PGW) 320, a policy charging and rules function (PCRF) server 330, and a traffic monitor 340. In general, a number of other networks devices, which are not shown herein for clarity, may also be used in the implementation of LTE network 130.

As previously discussed, base stations 120 may each include one or more computation and/or communication devices that receive voice and/or data (e.g., video content) and transmit that voice and/or data to customer premise 110. In one implementation, base station 120 may utilize LTE standards operating in a 700 MHz frequency band. Base station 120 may provide the radio interface between LTE network 130 and customer premises 110.

Each base station 120 may be associated with one or more geographical service areas surrounding the base station. The service areas may be referred to as wireless "sectors" that are defined by the radio range of base station 120. A single sector, corresponding to each of base stations 120, is shown as sector 350 in FIG. 3.

PGW 130 may provide connectivity to external networks, such as packet network 305. A customer premise 110 may have simultaneous connectivity with more than one PGW to multiple additional networks. PGW 320 may perform, for example, policy enforcement, packet filtering for each user, charging support, lawful interception, and/or packet screening.

PCRF 330 may be a server that may access subscriber databases and other resources to make policy decisions relating to subscribers (i.e., customer premise 110). The policy decisions may relate to, for example, quality of service (QoS) decisions and charging rules.

Traffic monitor 340 may include one or more devices that monitor traffic at base stations 120. In one implementation, traffic monitor 340 may keep track of the radio interfaces of base stations 120. For example, traffic monitor 340 may track the total number of connected users in each of sectors 350, the total bandwidth being used in sectors 350, the amount of free bandwidth in each of sectors 350, and/or some other metric relating to a current congestion or load level at a base station 120. Traffic monitor 340 may receive information relating to the load/congestion of a sector 350 from base stations 120 and/or from PGW 320.

Although FIG. 3 illustrates components in a portion of environment 100, in other implementations, the portion of environment 100 may include additional components, fewer components, different components, or differently arranged components than those illustrated in FIG. 3 and described herein. Alternatively, or additionally, one or more components of the portion of environment 100 may perform one or more tasks described as being performed by one or more other components of the portion of environment 100.

Figure 4:
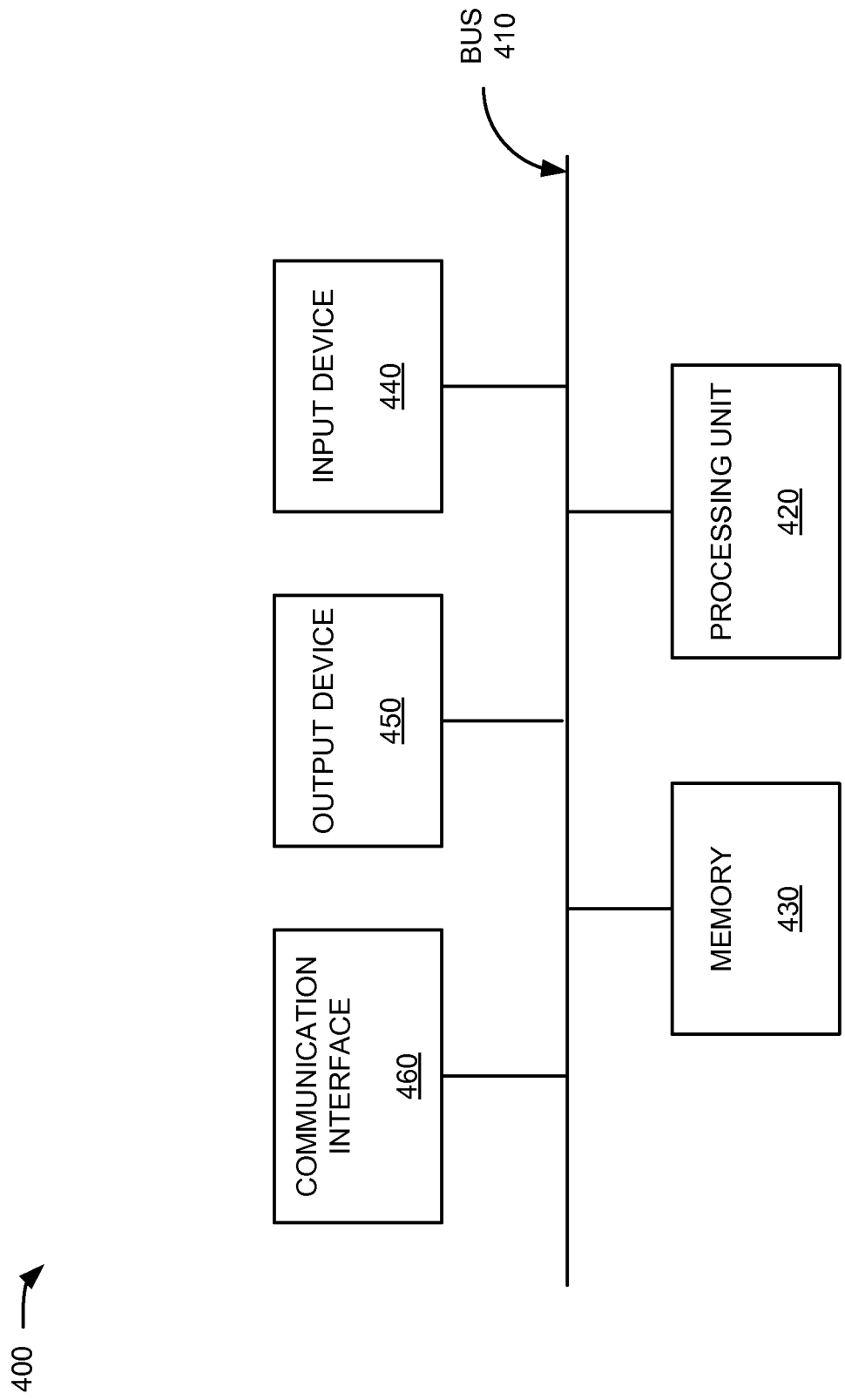
FIG. 4 is a diagram of example components of a device that may correspond to one of the devices shown in FIGS. 1-3.

FIG. 4 is a diagram of example components of a device 400 that may correspond to one of the components of customer premise 110, LTE network 130, or packet network 305 (e.g., STB 230, local router 260, user device 270, VoD server 310, PGW 320, PCRF 330, traffic monitor 340, etc.). As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. Additionally or alternatively, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more tasks described as being performed by one or more other components of device 400.

Figure 5:
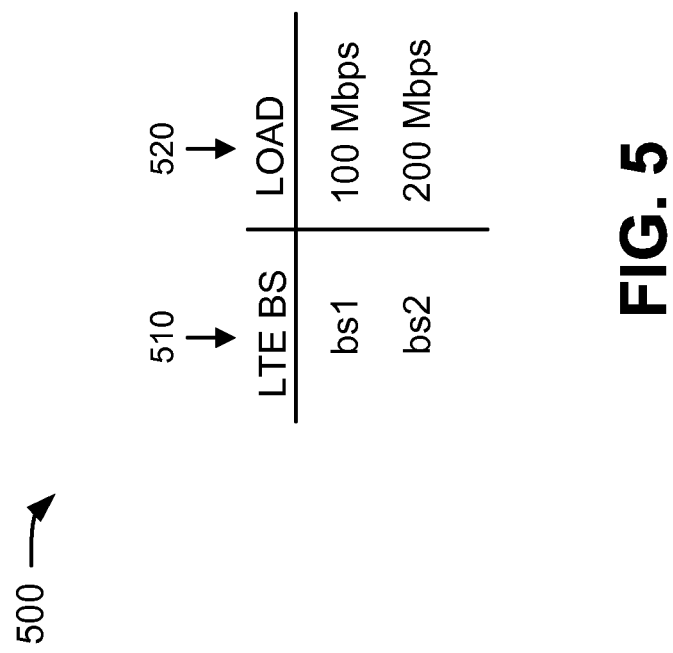
FIG. 5 is a diagram illustrating an example of a data structure that may be maintained by the traffic monitor shown in FIG. 3.

FIG. 5 is a diagram illustrating an example of a data structure 500 that may be maintained by traffic monitor 340. Data structure 500 may include LTE base station (LTE BS) field 510 and load field 520.

LTE base station field 510 may store, for each entry in data structure 500, a value identifying a particular base station 120. LTE base station field 510 may include, for example, a character sequence the uniquely identifies a particular base station 120 in LTE network 130. In an alternative implementation, instead of identifying base stations, LTE base station field 510 may identify particular sectors maintained by base stations 120.

Load field 520 may store an indication of the traffic load that is being experienced by the corresponding base station 120. In various implementations, the traffic load for a base station may be expressed in a number of ways, such as an average traffic load of the base station over a predetermined time period, the peak load in the sector over a predetermined time period, a number of subscribers connected to the base station, etc. In the example of FIG. 5, load field 520 may be expressed as the aggregate average load for the base station over a certain period, such as the previous 10 minutes. Thus, for the base station labeled "bs1," the average load over the last 10 minutes is illustrated as 100 Mbps (mega bits per second), and for the base station labeled "bs2," the average load over the last 10 minutes is illustrated as 200 Mbps.

The fields shown for data structure 500 are examples of possible fields that may be maintained by traffic monitor 340. In alternative implementations, different fields, additional fields, or fewer fields may be used in data structure 500.

Satellite network 140, as a one way (download) link to customer premise 110, may be limited in its ability to provide certain types of content to the customer premise, such as VoD content. Consistent with aspects described herein, a wireless terrestrial network, such as LTE network 130, may be used to supplement satellite network 140 by providing certain content, such the VoD content, over the wireless network. The delivery of this supplemental video over LTE network 130 may be controlled as not to interfere with the "normal" data delivered over LTE network 130, such as voice data and data delivered as part of subscriber Internet usage.

Figure 6:
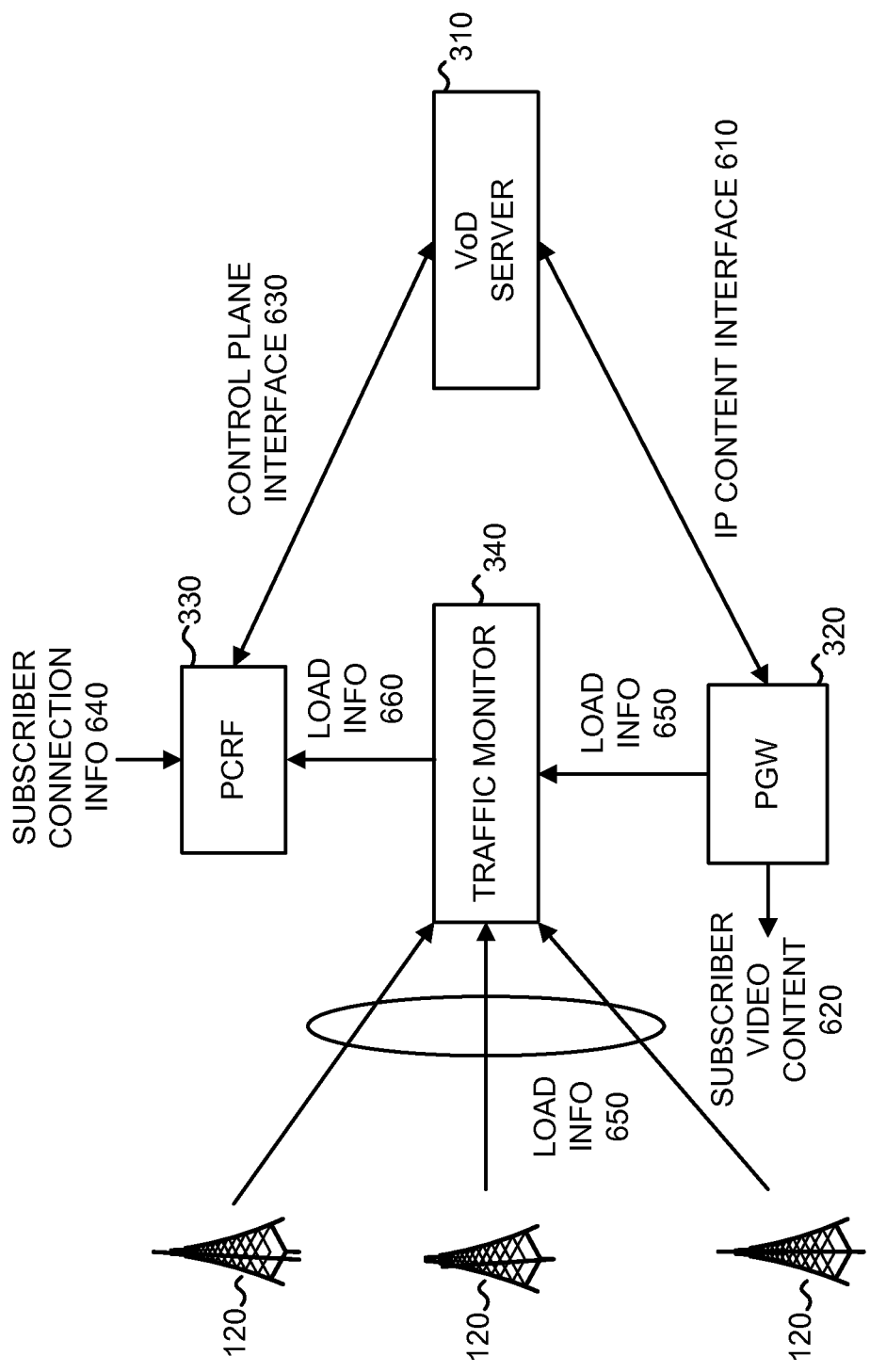
FIG. 6 is a diagram illustrating example communication paths between components of FIG. 3.

FIG. 6 is a diagram illustrating example communication paths between components of FIG. 3. The substantive video content corresponding to requested VoD content may be transmitted, over interface 610, to PGW 320, which may forward the video to the requesting customer premise 110, as subscriber video content 620. VoD server 310 may also include a control plane interface 630 to PCRF 330. VoD server 310, through control plane interface 630, may inform PCFR 330 of VoD requests made by different customer premises 110. PCRF 330 may respond by granting or denying permission for VoD server 310 to begin transmitting content in response to the request. PCRF 330 may also receive subscriber connection information 640, which may be received, for example, as part of the initial attachment of the subscriber to LTE network 130. Subscriber connection information 640 may include information such as the base station 120 and/or sector 350 to which the subscriber is attached, whether the subscriber is provisioned as a VoD customer, billing information or restrictions relating to VoD services, or other information relating to the subscriber.

Sector load information 650 may be periodically or occasionally received, by traffic monitor 340, from base stations 120 and/or from PGW 320. As previously discussed, sector load information 650 may include the average traffic load of a sector and/or base station over a predetermined time period, the peak load in the sector over the predetermined time period, etc. Traffic monitor 340 may maintain the load information in data structure 500. Traffic monitor 340 may provide the sector load information, as maintained in data structure 500, to PCRF 330 (load information 660). Load information 660 may be provided to PCRF 330 at certain intervals or on request from PCRF 330. For example, PCRF 330 may send a request to traffic monitor 340 for the current load associated with a particular base station or sector. In response, traffic monitor 340 may look up the load value in load field 520 and transmit the load value to PCRF 330.

A number of communication paths are illustrated in FIG. 6. Additional, different, or fewer communication paths may, in some implementations, be used in LTE network 130 and/or packet network 305.

Figure 7:
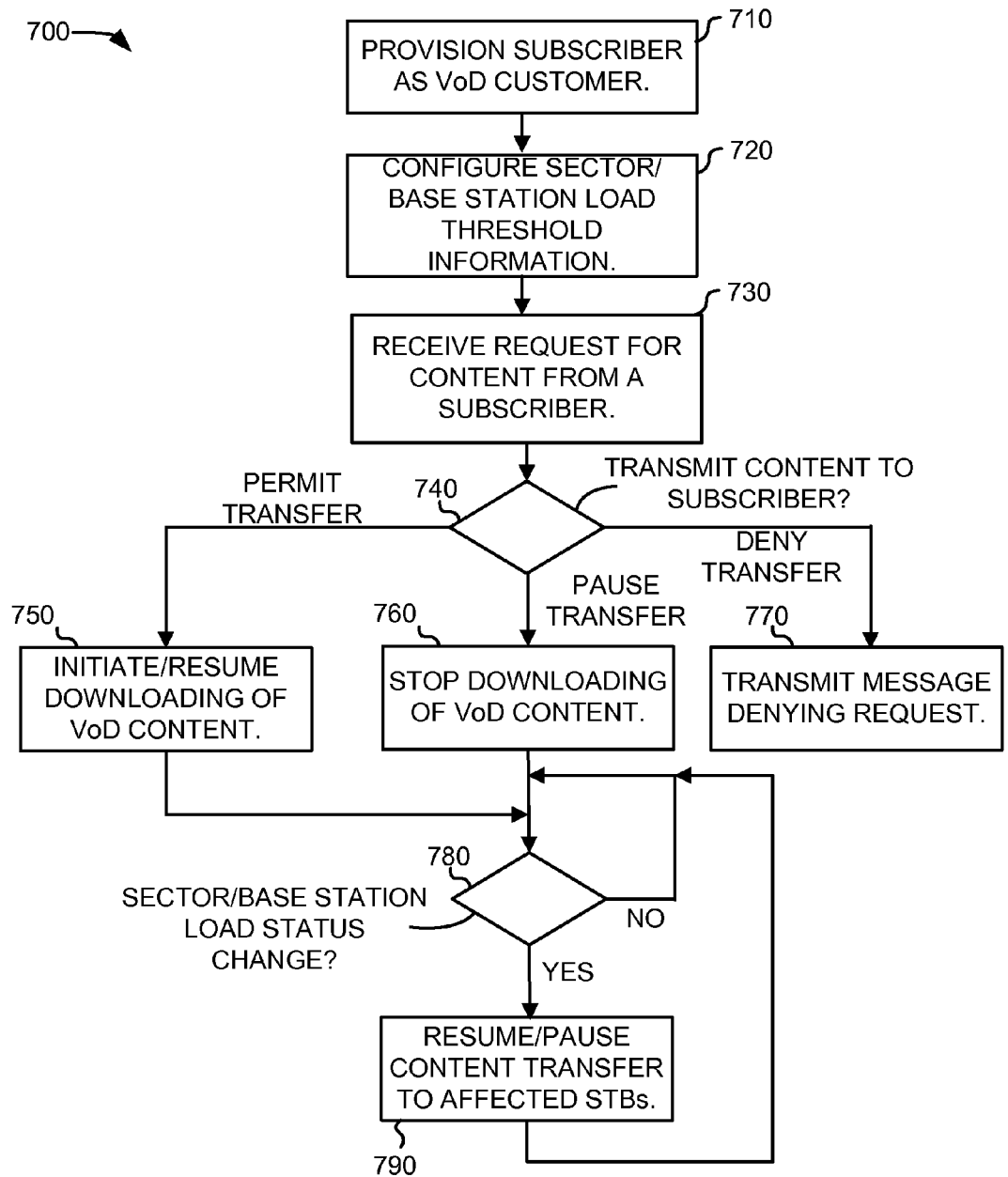
FIG. 7 is a flow chart illustrating an example process for implementing video on demand through a long term evolution (LTE) network.

FIG. 7 is a flow chart illustrating an example process 700 for implementing video on demand through an LTE network.

Process 700 may include provisioning a subscriber as a VoD customer in PCRF 330 (block 710). The provisioning may be performed when combined gateway equipment 115 is installed at a customer premise 110 and/or whenever outdoor broadband unit 200 first attaches to LTE network 130 (e.g., whenever outdoor broadband unit 200 is powered-up). In one implementation, block 710 may be performed in response to reception of subscriber connection information 640 at PCRF 330.

Process 700 may further include configuring PCRF 330 with sector/base station load threshold information (block 720). The threshold information may define a load value(s) at which VoD downloads to a subscriber may be denied. The threshold information may be, for example, statically programmed by an administrator. Alternatively, the threshold information may be dynamically determined based on, for example, the total capacity of a particular base station 120 or based on other information. In some implementations, a threshold value may be set for all base stations 120. Alternatively, the threshold values may be set on a per-base station basis.

After the setup and provisioning of the VoD environment, as performed in blocks 710 and 720, VoD server 310 may operate to deliver VoD content (e.g., movies) to customer premises 110. This "run-time" operation of environment 100 will next be discussed with reference to blocks 730-790.

Process 700 may further include receiving a content request from a subscriber (block 730). For example, a subscriber at customer premise 110 may request a movie to view as a VoD content. The subscriber may input the request through a STB 230, which may forward the request to VoD server 310. VoD server 310 may receive the request from the subscriber.

In response to the request, VoD server 310 may determine whether to transmit the content to the subscriber (block 740). VoD server 310 may, for instance, forward the request to PCRF 330 over control plane interface 630. The request forwarded to PCRF 330 may include an indication of the requesting subscriber, an indication of the VoD content, and/or the size of the content. Depending on the current network load at the base station 120 and/or sector 350, corresponding to the subscriber, PCRF 330 may determine whether to permit the content to be immediately transmitted to the user (block 740—PERMIT TRANSFER), deny transmission of the content (block 740—DENY TRANSFER), or pause transmission (block 740—PAUSE TRANSFER) until later.

For example, PCRF 330 may compare the current load of the sector corresponding to the subscriber (e.g., as maintained in data structure 500) to the threshold configured for that sector (i.e., in block 720). If the threshold comparison indicates that the sector is in a "lightly loaded" state (e.g., the current load is less than the threshold), PCRF 330 may respond to the request from VoD server 310 to indicate that downloading of the VoD content may proceed (block 740—PERMIT TRANSFER). VoD server 310 may then initiate and/or resume downloading of the VoD content to the subscriber (block 750). VoD server 310 may transmit the content, through IP content interface 610 and base station 120, for over-the-air delivery of the content to outdoor broadband unit 200. Outdoor broadband unit 200 may forward the content over the subscriber's home network to one or more of STBs 230. STBs 230 may then buffer the content for viewing by the subscriber. For example, for a VoD movie rental, STBs 230 may buffer the received content until at least a certain portion of the movie is received. At this point, the STB 230 may inform the user that the movie is ready for viewing. STB 230 may also implement any digital rights management protections that apply to the received content. For example, rented VoD movies may be encrypted and may only be allowed to be played on STB 230 for a limited period after the content is available to be viewed.

In some situations, however, PCRF 330 may determine that the current load of the sector corresponding to the subscriber is above the threshold configured for that sector (i.e., the sector is in a second "heavily loaded" state). In this case, PCRF 330 may respond to the request from VoD server 310 to indicate that downloading of the VoD should be paused (block 740—PAUSE TRANSFER). VoD server 310 may stop the downloading of content that is currently being performed in the affected sectors/base stations (block 760). A STB 230 that is receiving the stopped VoD content may continue to store any content that has already been downloaded.

In some situations, requested content may be denied to a subscriber (block 740—DENY TRANSFER). For example, PCRF 330 may determine that the subscriber's account is not authorized to purchase the VoD content and may respond to the request from VoD server 310 to indicate that downloading of the VoD content is denied. This may be the case when, for instance, the subscriber has equipment that is not compatible with VoD (e.g., the subscriber's STB 230 does not include local storage to buffer the VoD content) or the subscriber has disabled VoD functionality. In response, VoD server 310 may transmit a message, denying the request, to STB 230 (block 770).

Process 700 may further include determining whether the load status for a sector/base station changes (block 780). As previously mentioned, traffic monitor 340 may periodically or occasionally transmit sector load information 660 to PCRF 330. When a base station's or sector's load status changes, such as a sector with a light load becoming heavy (i.e., the sector load value increases above the sector threshold) or a sector with a heavy load becoming light (i.e., the sector load value decreases below the sector threshold), PCRF 330 may transmit updates to VoD server 310. The updates may indicate, for example, that content transfers to certain STBs 230 should be paused or that currently paused or delayed content transfers should be resumed. VoD server 310 may correspondingly resume or pause the content transfers to the affected STBs 230 (block 780—YES; and block 790). In this manner, the VoD content transfer can be opportunistically paused and resumed in response to change load conditions. In some implementations, download periods may be relatively short, such as on the order of minutes, before pausing a download due to an increase in sector/base station load.

In some implementations, when determining whether to permit content to be transmitted to a user, PCRF 330 may perform other functions. For example, if subscribers have a bandwidth limit, such as a monthly limit, PCRF 330 may be configured to exclude VoD downloads from the limit. Thus, PCRF 330, as part of permitting a VoD download, may credit the subscriber's account based on the size of the VoD download.

Blocks 730-790 of FIG. 7 were described above as being performed by VoD server 310. Alternatively, some or all of the functionality of VoD server 310 may be performed by another device, such as STB 230. In this situation, STB 230 may determine whether content can be received and, based on the determination, begin to download or delay downloading of the video content.

Figure 8:
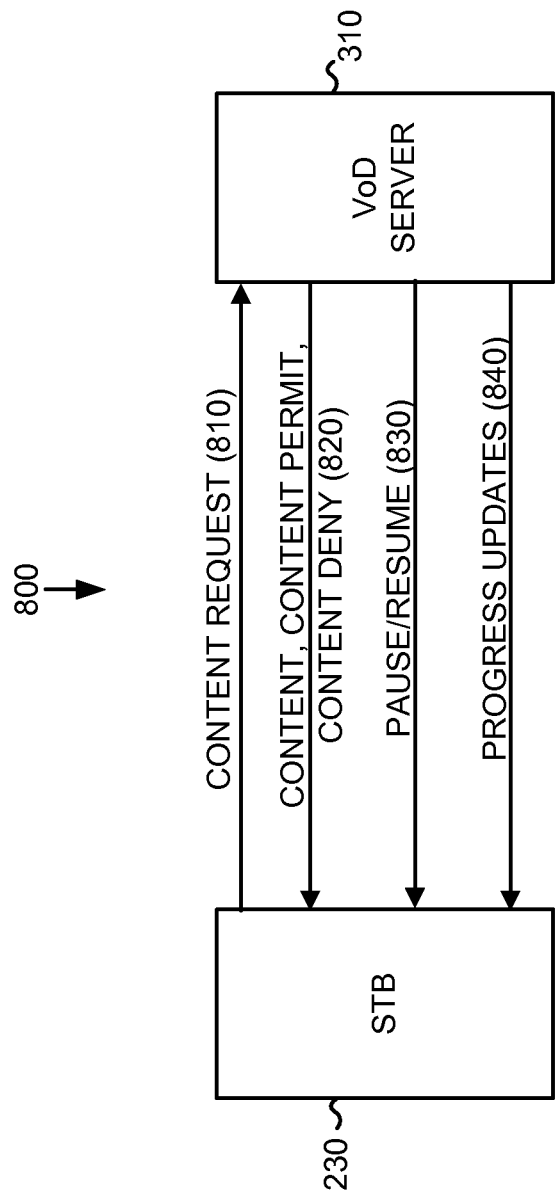
FIG. 8 is a diagram illustrating an example of communications between a set-top box and a video on demand server.

FIG. 8 is a diagram illustrating an example of communications 800 between STB 230 and VoD server 310 during a request for VoD in LTE network 130. Communications 800 may be exchanged, for instance, during process 700.

As shown, STB 230 may initially request video content, such as VoD content, via a content request communication 810. Content request communication 810 may include, for example, the name or an identifier of the content and an identification of the subscriber and/or an identification of STB 230.

In response to content request communication 810, VoD server 310, such as by contacting PCRF 330, may determine whether to permit transfer of the content or deny transfer of the content (process 700, blocks 740, 750, 760, and 770). VoD server 310 may transmit the content (if permitted) and/or a message indicating whether the content request was accepted or denied (communication 820). As previously discussed, the decision of whether to begin transferring the requested content may be based at least on the load of the sector at which the subscriber is connected to LTE network 130. If a content request is otherwise accepted but the load of the sector is determined to be too high (e.g., as determined by a comparison to a predetermined threshold value), communication 820 may include a message indicating that the content is permitted but that downloading of the content is currently paused.

At some point, the load status of a sector/base station may change (process 700, block 780). In response, VoD server 310 may update the transfer state of VoD content to STB 230. VoD server 310 may, for example, pause or resume transmission of a download to STB 230 (communication 830).

In some implementations, VoD server 310 may send progress updates to STB 230 (communication 840). The progress updates may include, for example, an estimate of when a paused download will resume downloading, an estimate of when requested content will be available for viewing by the user, whether a particular piece of content can be watched while it is downloading, or whether the content must be fully downloaded before the subscriber is allowed to begin watching the content.

Figure 9:
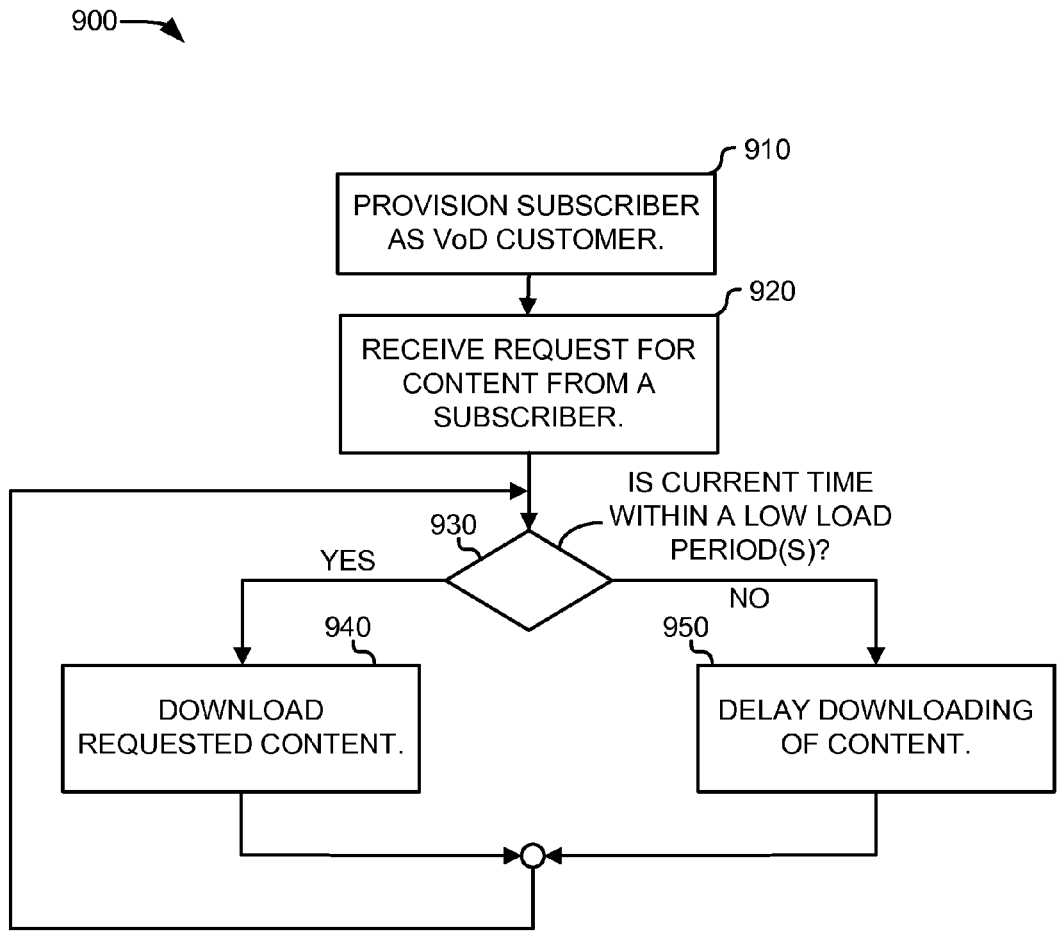
FIG. 9 is a flow chart illustrating an example process for implementing video on demand through an LTE network according to an alternative possible implementation.

FIG. 9 is a flow chart illustrating an example process 900 for implementing VoD through an LTE network according to an alternative possible implementation. Instead of forming download decisions based on the load of a sector/base station, according to the alternative implementation of process 900, download decisions may be made based on a download time window. The download time window may generally correspond to periods of low loads in LTE network 130.

Process 900 may include provisioning a subscriber as a VoD customer in PCRF 330 (block 910). The provisioning may be performed when combined gateway equipment 115 is installed at a customer premise 110 and/or whenever outdoor broadband unit 200 first attaches to network 130 (e.g., whenever outdoor broadband unit 200 is powered-up). In one implementation, block 910 may be performed in response to reception of subscriber connection information 640 at PCRF 330.

Process 900 may further include receiving a content request, for a content item, from a subscriber (block 920). For example, a subscriber at customer premise 110 may request a movie to view as a VoD content. The subscriber may input the request through STB 230, which may forward the request to VoD server 310. VoD server 310 may receive the request from the subscriber.

Process 900 may next include determining whether the current time is within a low load period (block 930). The content item may only be transmitted to the subscriber during certain periods of the day. The periods may, for instance, be periods that correspond to the low load periods. The low load periods may be periods that correspond to low load periods for LTE network 130 as a whole. Alternatively, the low load periods may be determined on a per-sector or per-base station basis. In one implementation, an administrator may manually determine the periods based on, for example, analysis of historic network load patterns. For example, the period between 11 pm and 6 am may typically experience low traffic levels throughout LTE network 130. The administrator may thus configure this time window as a low load period. The determined low load periods may be stored at PCRF 330. For example, a start and end time may be stored at PCRF 330, indicating a daily start and end time that defines the low load period. In alternative implementations, the low load periods may be determined automatically, such as based on an automatic analysis of network load over a quantity of previous days. For instance, PCRF 330 may be configured to, on a daily basis, automatically determine which eight hour period, over the last week, experienced the lowest average load. This eight hour window may then be set as the low load period for the next day.

In one implementation, in response to the request for the content item, VoD server 310 may make a request to PCRF 330 to determine whether the request can be satisfied. PCRF 330 may respond with the start and end times for the low load period(s). VoD server 310 may then determine whether the current time is within the low load period(s) received from PCRF 330. In some implementations, in addition to sending the start and end times for the low load period(s), PCRF 330 may transmit additional information to VoD server 310, such as a maximum allowed transmission rate for the content item.

When the current time is within the low load period (block 930—YES), VoD server 310 may download the content item to STB 230 (block 940). When the current time is not within the low load period (block 930—NO), downloading of the content item may be delayed until the beginning of the low load period (block 950).

In some implementations, PCRF 330 may transmit the start and end times for the low load period(s) to PGW 320. The start and end times for the low load period(s) may be used to implement policies by PGW 320. The policies may only allow the downloading of VoD content during the low load period(s).

When downloading a VoD content item, the determination of whether the current time is within the low load period(s) may be continuously made. In this manner, a VoD download that begins during a low load period and that continues outside of the low load period may be paused at the end of the low load period. The download may continue at the beginning of the next low load period.

Blocks 920-950 of FIG. 9 were described above as being performed by VoD server 310. Alternatively, some or all of the functionality of VoD server 310 may be performed by another device, such as STB 230. In this situation, STB 230 may determine whether the current time is within a low load period and, based on the determination, begin to download or delay downloading of the video content.

As described with respect to FIG. 9, video content in a combined wireless broadband/satellite network may only be transmitted over the wireless broadband portion of the network during low load periods. The low load periods may be determined as preset time windows. In this manner, congestion in the wireless portion of the network, due to the video content downloads, can be controlled.

In some implementations, traffic monitor 340 can be implemented in conjunction with process 900, so that VoD content may be restricted from being downloaded based on historically low load periods and based on measured periods of low load. Alternatively, process 900 may be implemented without regard to monitored traffic loads. In such an implementation, traffic monitor 340 may not be necessary.

Although the techniques described above for delivering VoD content were described as being performed in the context of a combined satellite and wireless broadband system, in some implementations, the satellite network may be omitted. In this situation, the set-top box may continue to download the VoD content over the wireless network while standard television broadcasts may be omitted or received through a different channel.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software (e.g., a processor executing instructions).

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more devices, the method comprising:
    receiving, by the one or more devices, load information regarding network traffic load at radio interfaces for a long term evolution (LTE) network;
    receiving, by the one or more devices, a request made by a subscriber, from a set-top box that receives television programming content from a satellite network and video on demand content from the LTE network, for video content corresponding to the video on demand content from the LTE network;
    determining, by the one or more devices and based on the load information, whether a portion of the LTE network corresponding to the subscriber is in a first state or a second state;
    transmitting, based on the request and by the one or more devices over the LTE network, the video content when the portion of the network corresponding to the subscriber is in the first state;
    delaying transmission, over the LTE network and by the one or more devices, of the video content when the portion of the network corresponding to the subscriber is in the second state, until the portion of the network corresponding to the subscriber enters the first state;
    pausing transmission, by the one or more devices, of the video content when the portion of the LTE network corresponding to the request enters the second state from the first state, the pausing occurring after transmission of the video content begins;
    transmitting, by the one or more devices, based on the pausing of the transmission, a progress update providing an estimation of when the paused transmission of the video content will resume; and
    resuming transmission, by the one or more devices, of the paused video content when the portion of the LTE network corresponding to the request enters the first state from the second state.

2. The method of claim 1, where the portion of the LTE network corresponding to the subscriber includes a base station through which the subscriber connects to the LTE network.

3. The method of claim 2, where determining whether the portion of the LTE network corresponding to the subscriber is in the first state or the second state further includes:
    comparing an indication of load of the base station to a threshold and determining that the base station is in the first state when the indication of load is below the threshold and determining that the base station is in the second state when the indication of load is above the threshold.

4. The method of claim 1, where determining whether the portion of the LTE network corresponding to the subscriber is in the first state or the second state further includes:
    determining that the portion of the network corresponding to the subscriber is in the first state when a current time falls within a predetermined time window; and
    determining that the portion of the network corresponding to the subscriber is in the second state when the current time falls outside the predetermined time window.

5. The method of claim 4, where a start time and an end time defining the predetermined time window are set by a network administrator based on an analysis of historical network traffic.

6. The method of claim 4, where a start time and an end time defining the predetermined time window are set based on automatic analysis of historical network traffic.

7. The method of claim 4, where the predetermined time window corresponds to a period of historically low network load.

8. The method of claim 1, where the determination of whether the portion of the LTE network corresponding to the subscriber is in the first state or the second state is performed by a policy charging and rules function (PCRF) server in the LTE network.

9. The method of claim 1, where receiving the load information further includes:
    receiving the load information from base stations or packet data network gateways in the LTE network.

10. A system comprising:
    a traffic monitor to store load information regarding network traffic load at radio interfaces for a cellular wireless network; and
    a video server to:
        receive a request, over the cellular wireless network and from a set-top box that receives television programming content from a satellite network and video on demand content from the cellular wireless network, for a video content item corresponding to the video on demand content, for playback by a set-top box, the video server determining, in response to the request, and based on the load information, whether a portion of the cellular wireless network through which the set-top box connects is in a first state or a second state, where the first and second state relate to network load,
        transmit, based on the request, the video content item when the portion of the network to which the outdoor broadband unit connects is in the first state,
        delay transmission of the video content item when the portion of the network through which the set-top box connects is in the second state, until the portion of the network enters the first state,
        pause transmission of the video content item when the portion of the cellular wireless network enters the second state, the pausing occurring after transmission of the video content begins;

transmit, based on the pausing of the transmission, a progress update providing an estimation of when the paused transmission of the video content will resume, and resume transmission of the paused video content item when the portion of the cellular wireless network enters the first state from the second state.

11. The system of claim 10, where the cellular wireless network includes a long term evolution (LTE) network.

12. The system of claim 10, further comprising:

a policy charging and rules function (PCRF) server to provide, to the video server, the determination of whether the portion of the wireless network through which the set-top box connects is in the first state or the second state.

13. The system of claim 12, where the PCRF server determines the state of the portion of the cellular wireless network through which the set-top box connects by comparing the load information to a threshold and determining that the portion of the cellular wireless network through which the set-top box connects is in the first state when the load information is below the threshold and determining that the portion of the cellular wireless network is in the second state when the load information is above the threshold.

14. The system of claim 12, where the PCRF server:

determines that the portion of the cellular wireless network is in the first state when a current time falls within a predetermined time window; and determine that the portion of the cellular wireless network is in the second state when the current time falls outside the predetermined time window.

15. The system of claim 14, where a start time and an end time defining the predetermined time window are set by a network administrator based on an analysis of historical network traffic.

16. The system of claim 14, where the predetermined time window corresponds to a period of historically low network load.

17. A device comprising:

one or more processors; and one or more memories, coupled to the one or more processors, the one or more memories storing instructions, that when executed by the one or more processors, cause the one or more processors to:

receive load information regarding network traffic load at radio interfaces for a long term evolution (LTE) network, determine, based on the load information, whether a portion of the LTE network corresponding to a set-top box that receives television programming content from a satellite network and video on demand content from the LTE network, is in a first state, the set-top box requesting video on demand content from the LTE network, permit the video on demand content to be downloaded to the set-top box when the portion of the LTE network is in the first state, delay downloading of the video on demand content, to the set-top box, when the portion of the LTE network is not in the first state, pause downloading of the video on demand content when the portion of the LTE network corresponding to the set-top box exits the first state, the pausing occurring after downloading of the video on demand content begins, transmit, based on the pausing of the transmission, a progress update providing an estimation of when the paused transmission of the video content will resume; and resume downloading of the paused video on demand content when the portion of the LTE network corresponding to the set-top box enters the first state.

18. The device of claim 17, where the device includes a policy charging and rules function (PCRF) server.

19. The device of claim 17, where the instructions additionally cause the one or more processors to:

compare the load information to a threshold and determine that the portion of the LTE network corresponding to the set-top box is in the first state when the load information indicates that network traffic load is below the threshold, and determine that the portion of the LTE network corresponding to the set-top box is not in the first state when the load information indicates that network traffic load is above the threshold.

20. The method of claim 1, wherein the progress update further includes:

an estimate of when the video content will be available for viewing; or an indication of whether the video content can be watched while the video content is downloading.

21. The system of claim 10, wherein the progress update further includes:

an estimate of when the video content will be available for viewing; or an indication of whether the video content can be watched while the video content is downloading.

22. The system of claim 10, wherein the progress update further includes:

an estimate of when the video content will be available for viewing; or an indication of whether the video content can be watched while the video content is downloading.

* * * * *